US005985413A

United States Patent [19]

Boyle et al.

[11] Patent Number: 5,985,413

[45] Date of Patent: Nov. 16, 1999

[54] COLOR DISPLAY

[75] Inventors: Richard A. Boyle, Neosho; John S. Runte, Milwaukee, both of Wis.

[73] Assignee: DCI Marketing, Inc., Milwaukee, Wis.

[21] Appl. No.: 08/903,902

[22] Filed: Jul. 31, 1997

[51] Int. Cl.[6] .............................. B32B 1/00; G09B 19/00

[52] U.S. Cl. ....................... 428/174; 428/207; 40/124.07; 434/98

[58] Field of Search .............................. 428/174, 13, 207, 428/192; 40/124.01, 124.07; 211/50; 434/98

[56] References Cited

U.S. PATENT DOCUMENTS

| | | | |
|---|---|---|---|
| D. 164,598 | 9/1951 | Peters . | |
| 299,751 | 6/1884 | DePlanque . | |
| 402,859 | 5/1889 | Rose . | |
| 1,474,561 | 11/1923 | Sonnekes . | |
| 1,837,743 | 12/1931 | Wilson et al. . | |
| 1,839,972 | 1/1932 | Lang et al. . | |
| 2,160,724 | 5/1939 | Fletcher | 40/125 |
| 2,494,072 | 1/1950 | Vetterli . | |
| 2,828,554 | 4/1958 | Harris . | |
| 4,003,470 | 1/1977 | Lagorio et al. | 211/50 |
| 4,457,718 | 7/1984 | Lerner | 40/492 |

*Primary Examiner*—Donald Loney
*Attorney, Agent, or Firm*—Michael Best & Friedrich LLP

[57] ABSTRACT

A color display including a display member fabricated of plastic having a domed portion onto which a paint color is applied.

20 Claims, 2 Drawing Sheets

COLOR DISPLAY

FIELD OF THE INVENTION

The invention relates to displays for displaying colors.

BACKGROUND OF THE INVENTION

When purchasing articles that can be custom manufactured in a variety of colors, consumers often cannot see the articles in all of the available color choices due to inventory constraints. For example, when purchasing an automobile, dealerships most often cannot stock each model of automobile in each of its available color choices.

As a substitute, the consumer is shown a color chart showing the available colors for the particular article. The colors are typically printed onto a flat support surface and that surface, termed a color chip, is affixed to the color chart. A disadvantage of this arrangement is that the surfaces of the actual article, e.g. an automobile, onto which the color is applied is most often not entirely flat. Therefore, the flat color chip is not a true representation of how the color would appear on the particular article itself.

SUMMARY OF THE INVENTION

The invention provides a color display that more accurately displays color. The color display is domed or convex to provide a non-planar surface onto which a paint color is applied and displayed. With a non-planar surface on the color display, the color for a non-planar article is more accurately represented. For example, most automobile surfaces are not planar. A domed color display presents the color closer to how the color would actually appear on the automobile. Therefore, after viewing a domed color display, a consumer can more accurately envision what an automobile would look like painted in a particular color. Further, the domed color display of the present invention enhances the color itself, as compared to flat chips making the appearance of the color more appealing to consumers.

It is an object of the present invention to provide an improved color display.

It is another object of the present invention to provide a color display that more accurately visually represents how a color would appear on a non-planar article.

It is another object of the present invention to provide a color display that enhances the appearance of the color itself.

Other features and advantages of the invention will become apparent to those of ordinary skill in the art upon review of the following detailed description, claims, and drawings.

Figure 1:
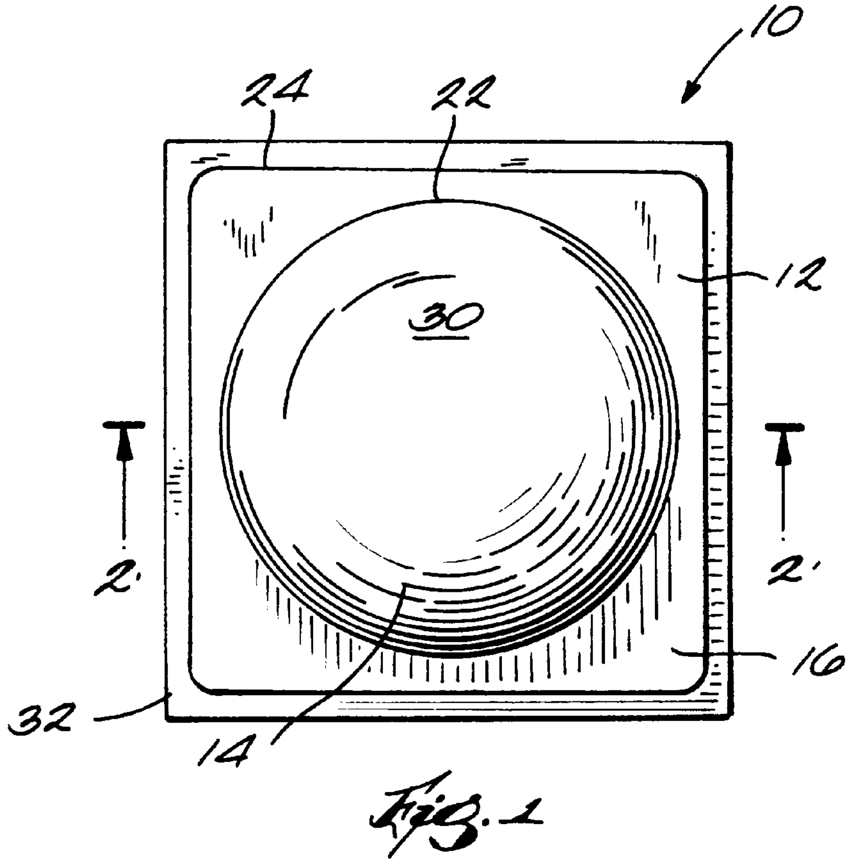
FIG. 1 is a plan view of a color display embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 2:
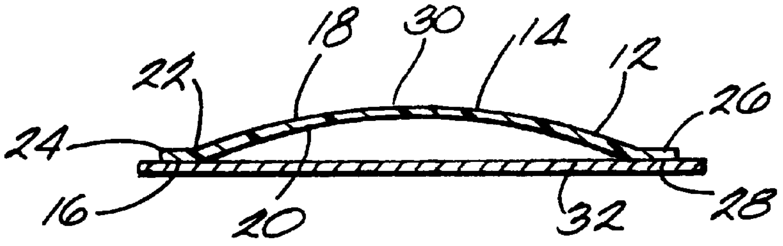
FIG. 2 is a sectional view taken along line 2—2 of FIG. 1.

Referring now to the drawings, there is shown in FIGS. 1 and 2 a color display 10 embodying the invention. The color display 10 includes a display member 12. The display member 12 is fabricated of a rigid or semi-rigid plastic material such as polyester. Preferably, the plastic is a clear plastic. However, it should be noted that opaque plastics can be used.

Preferably, the display member 12 includes a first portion 14 and a second portion 16 that are integral. The first portion 14 is non-planar and is generally domed, convex or arched. As is best shown in FIG. 2, the first portion 14 has an exterior surface 18 and an interior surface 20. The exterior surface 18 is generally convex and the interior surface 20 is generally concave. The first portion 14 has a periphery 22 that can be of varying shapes. As shown in FIG. 1, the periphery is circular. It should be noted that the periphery 22 could also be, for example, elliptical or rectangular.

Optionally, the display member 12 can be comprised of only the first portion 14 or the display member 12 can be comprised of the first portion 14 and the second portion 16 that are two separate pieces.

The second portion 16 is generally planar, i.e. in a single plane, and preferably surrounds the first portion 14. The second portion 16 has a periphery 24 that can be of varying shapes. As shown in FIG. 1, the periphery 24 of the second portion 16, is rectangular. The domed portion terminates in the same plane as the planar surface of second portion 16. That termination is periphery 22 which then in turn is in a single plane, i.e., that of the second portion. The domed portion is domed from along the entirety of the periphery 22. It should be noted that the periphery 24 could also be, for example, circular or elliptical. The second portion 16 includes an exterior surface 26 and an interior surface 28.

The color display 10 includes a paint color 30 covering the exterior surface 18 of the first portion 14 and, preferably but not necessary, covering the exterior surface 26 of the second portion 16. The paint color 30 can be of varying types such as lacquer or acrylic. Preferably, the paint color is applied to the display member 10 by blade coating and spraying. Any number of coats of paint color can be applied to the display member 12. For example, the same number of coats can be applied as would be applied to the actual article such as the automobile.

The paint layer is applied to the outer, or convex, surface of member 12 and, therefore, if desired, a protective coating can be applied over the paint color 30. For example, if a coating would be applied to the automobile surfaces, the same coating can be applied to chips to accurately represent the actual automobile finish. A protective coating such as clear coat can be applied over the paint color 30 such as by blade coating and spraying.

Optionally, the display member 12 can include more than one paint color such as to represent articles having two complementary colors thereon.

If desired, the display member 12 can be affixed to a support surface 32 such as a cardboard display. Preferably, the second portion 16 of the display member 12 is affixed to the support surface 32, such as by adhesive, with the interior surfaces 20 and 28 of the first portion 14 and the second portion 16, respectively, opposed the support surface 32.

Figure 3:
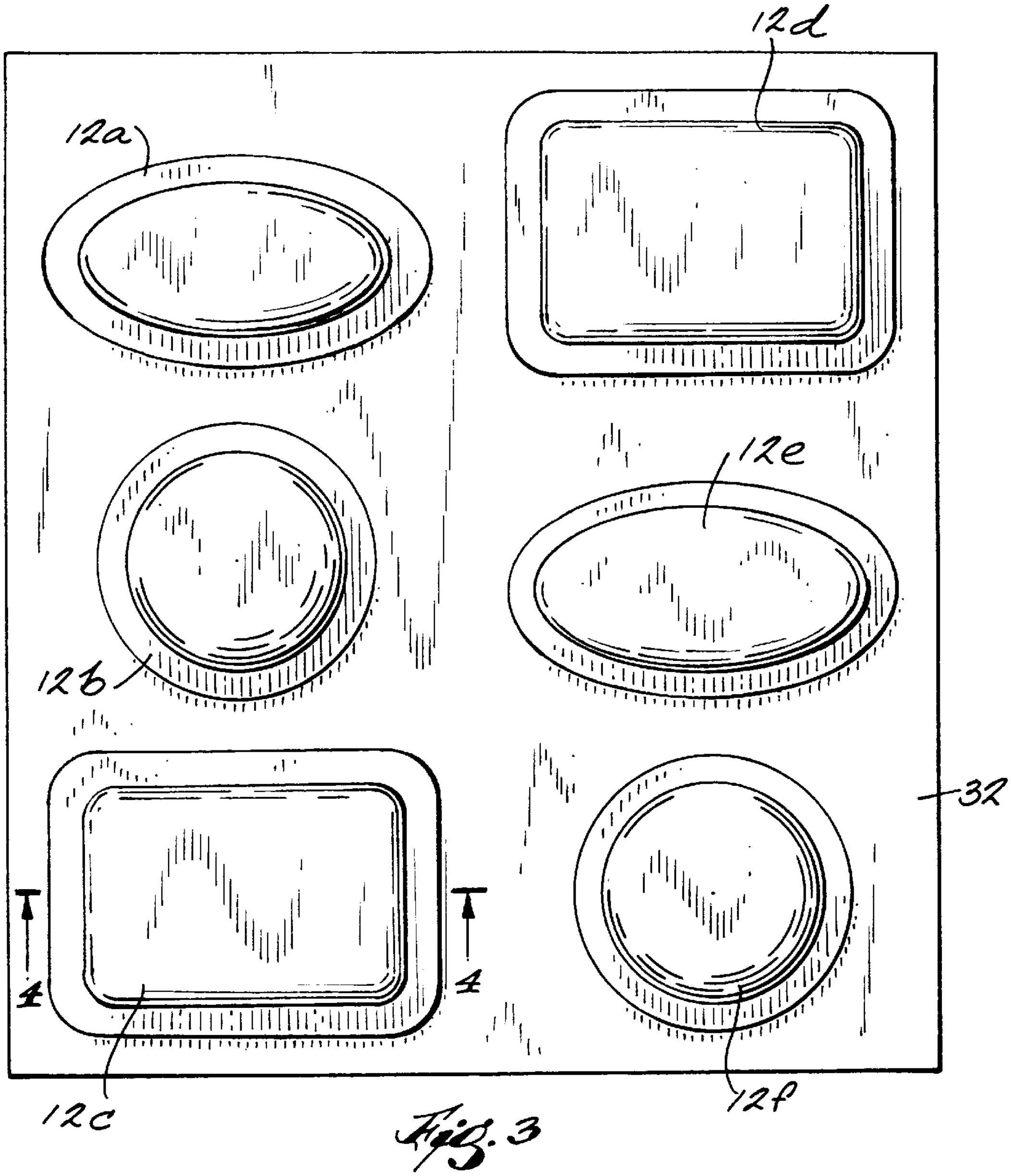
FIG. 3 is a plan view of a plurality of color displays.

As shown in FIG. 3, any number of display members 12*a–f* can be presented together in various configurations on the support surface 32.

Figure 4:
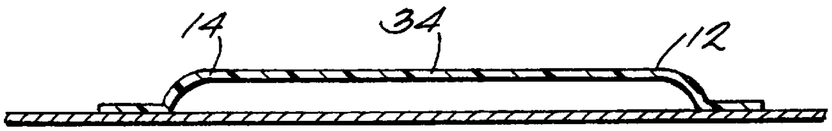
FIG. 4 is a section view of one of the color displays on FIG. 3 taken along line 4—4 of FIG. 3.

FIG. 4 illustrates a second embodiment of the display member 12. In this embodiment, the first portion 14 includes a planar central portion 34.

By applying a paint color to the display member 12 described herein, the non-planar shape of the display member 12 enhances the visual appearance of the paint color making the color not only appear more attractive to a consumer but more closely duplicate the actual article surface.

We claim:

1. A color display comprising:

a display member having a domed portion terminating in a periphery located in a single plane, said domed portion having an exterior surface and an interior surface, wherein said display member is fabricated of a plastic material; and a paint color applied to said exterior surface.

2. A color display as set forth in claim 1 wherein said display member is fabricated of a generally clear plastic material.

3. A color display as set forth in claim 1 and further including a protective coating applied over said paint color.

4. A color display as set forth in claim 1 wherein said domed portion is arched.

5. A color display as set forth in claim 1 wherein said exterior surface and said interior surface terminate in said periphery portion and said domed portion is domed from along the entirety of said peripheral portion.

6. A color display as set forth in claim 1 wherein said exterior surface is convex.

7. A color display as set forth in claim 1 wherein said interior surface is concave.

8. A color display as set forth in claim 1 and further including a support surface onto which said display member is affixed such that said interior surface opposes said support surface.

9. A color display as set forth in claim 1 wherein said display member includes a second portion apart from said domed portion, and wherein said paint color is applied to said second portion.

10. A color display as set forth in claim 9 wherein said second portion surrounds said domed portion.

11. A color display as set forth in claim 8 wherein said second portion is affixed to said support surface.

12. A color display as set forth in claim 1 and further including a second paint color applied to said domed portion.

13. A color display apparatus comprising:

a display member having a convex portion, said convex portion having an exterior surface that is generally convex and an interior surface that is generally concave, wherein said display member is fabricated of a plastic material;

a paint color applied to said exterior surface; and a support surface onto which said display member is affixed such that said interior surface opposes said support surface.

14. A color display apparatus as set forth in claim 13 wherein said display member includes a second portion apart from said convex portion, and wherein said second portion is planar.

15. A color display apparatus as set forth in claim 13 wherein said second portion surrounds said domed portion and wherein said second portion is affixed to said support surface.

16. A color display apparatus as set forth in claim 13 wherein said convex portion terminates in a planar surface.

17. A paint chip sample display comprising a substrate having an upper surface, a portion of said upper surface being generally convex, and a layer of preselected paint extending over said convex portion and forming an outer facing, exposed surface.

18. The paint chip sample display of claim 17 wherein the outer surface of said substrate has a generally continuous convex configuration.

19. The paint chip sample display of claim 18 wherein said concave surface is in the form of a segment of a sphere.

20. A color display comprising:

a display member having a domed portion, said domed portion includes a peripheral portion extending around said domed portion, said domed portion having an exterior surface and an interior surface and said exterior surface and said interior surface terminate in said peripheral portion, said domed portion being domed from along the entirety of said peripheral portion, and wherein said display member is fabricated of a plastic material; and a paint color applied to said exterior surface.

* * * * *